United States Patent
Kang

(10) Patent No.: US 9,824,078 B2
(45) Date of Patent: Nov. 21, 2017

(54) DEVICE AND METHOD FOR IMAGE SEARCH USING ONE OR MORE SELECTED WORDS

(71) Applicant: Samsung Electronics Co., Ltd., Suwon-si, Gyeonggi-do (KR)

(72) Inventor: Young-cheol Kang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/368,151

(22) Filed: Dec. 2, 2016

(65) Prior Publication Data

US 2017/0083496 A1   Mar. 23, 2017

Related U.S. Application Data

(63) Continuation of application No. 13/937,584, filed on Jul. 9, 2013, now Pat. No. 9,558,166.

(30) Foreign Application Priority Data

Oct. 17, 2012   (KR) ........................ 10-2012-0115505

(51) Int. Cl.
*G06F 17/00* (2006.01)
*G06F 17/24* (2006.01)
(Continued)

(52) U.S. Cl.
CPC ........ *G06F 17/24* (2013.01); *G06F 17/30265* (2013.01); *G06F 17/30864* (2013.01); *G06F 3/04842* (2013.01)

(58) Field of Classification Search
CPC .............................................. G06F 17/30864
See application file for complete search history.

(56) References Cited

U.S. PATENT DOCUMENTS 5,659,742 A * 8/1997 Beattie .............. G06F 17/30017
6,021,412 A   2/2000 Ho et al.
(Continued)

FOREIGN PATENT DOCUMENTS

CN   101079056 A   11/2007
CN   101196898 A   6/2008
(Continued)

OTHER PUBLICATIONS

Sanna et al., Special Edition Using Windows NT Workstation 4.0, Que, Aug. 1997, p. 1-3.
(Continued)

*Primary Examiner* — Amelia Tapp
(74) *Attorney, Agent, or Firm* — Jefferson IP Law, LLP

(57) ABSTRACT

A user terminal device is provided that includes a display part configured to display a document preparation window, an input part configured to receive a selection command for selecting a text in a document displayed in the document preparation window, a communication part configured to connect to a server, and a controller configured to control displaying of an activated search button in a region of the document preparation window when the text is selected, and to search for, when the search button is selected, at least one image corresponding to the selected text using the communication part, wherein the controller is further configured to control displaying of images searched for from at least one of the server and a storage part of the user terminal device, and to, when one of the searched images is selected, insert the selected image at a predetermined position of the document preparation window.

12 Claims, 13 Drawing Sheets

(51) Int. Cl.
  *G06F 17/30* (2006.01)
  *G06F 3/0484* (2013.01)

(56) References Cited

U.S. PATENT DOCUMENTS

| | | | |
|---|---|---|---|
| 7,051,019 | B1 | 5/2006 | Land et al. |
| 7,584,411 | B1 | 9/2009 | Alexander et al. |
| 7,660,822 | B1 | 2/2010 | Pfleger |
| 7,822,763 | B2 * | 10/2010 | Sauls ............ G06F 17/3064 707/766 |
| 8,131,707 | B2 | 3/2012 | Kim |
| 8,180,788 | B2 * | 5/2012 | Bennett ......... G06F 17/30244 375/240 |
| 8,200,649 | B2 | 6/2012 | Bennett |
| 8,612,896 | B2 | 12/2013 | Irie |
| 8,935,246 | B2 * | 1/2015 | Bengio ......... G06F 17/30277 707/736 |
| 2003/0172061 | A1 | 9/2003 | Krupin et al. |
| 2007/0174269 | A1 | 7/2007 | Jing et al. |
| 2008/0320384 | A1 | 12/2008 | Nagarajan |
| 2009/0024620 | A1 | 1/2009 | Kim |
| 2011/0187665 | A1 | 8/2011 | Irie |
| 2011/0191336 | A1 | 8/2011 | Wang et al. |
| 2011/0276876 | A1 | 11/2011 | Kwan et al. |
| 2015/0170203 | A1 * | 6/2015 | Kogan ............ G06F 17/30696 705/14.54 |

FOREIGN PATENT DOCUMENTS

| | | |
|---|---|---|
| CN | 101984420 A | 3/2011 |
| JP | 2007-47962 A | 2/2007 |
| JP | 2010-33450 A | 2/2010 |
| JP | 2011-221794 A | 11/2011 |
| KR | 10-2006-0107289 A | 10/2006 |
| WO | 2012-040827 A2 | 4/2012 |

OTHER PUBLICATIONS

Atlantis Word Processor Online Help, p. 1-17, captured by Internet Archive Wayback Machine Apr.-May 2011, retrieved from https://web.archive.org/web/2011040533140 http:/www.atlantiswordprocessor.com/en/help/control_board_cliplib.htm.

Google Drive Blog, "Tips & Tricks: Using Images in Google documents," Jul. 1, 2010, pp. 1-8, available at http:/googledrive.blogspot.com/2010/07/tips-tricks-using-images-in-google.html.

Lambert et al., "MOS 2010 Study Guide for Microsoft Word" published Sep. 2011, "Insert and Format Clip Art" 5 pages.

European Search Report, dated May 26, 2017, issued in the European Application No. 13 846 272.6 which was filed on Mar. 24, 2015.

Chinese Office Action, dated Jul. 17, 2017, issued in the Chinese Patent Application No. 201380054405.7 which was filed on Apr. 17, 2015.

Japanese Office Action dated Sep. 15, 2017, issued in the Japanese Application No. 2015-538017.

* cited by examiner

FIG. 2
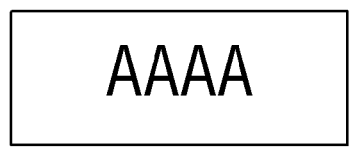
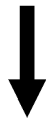
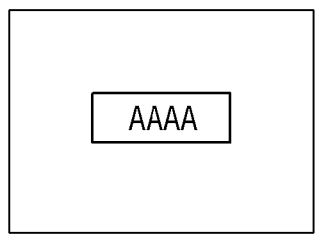 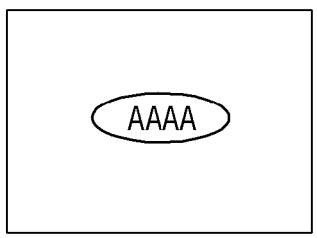 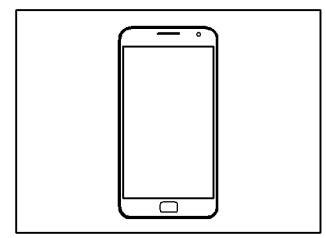
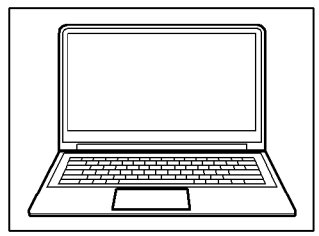 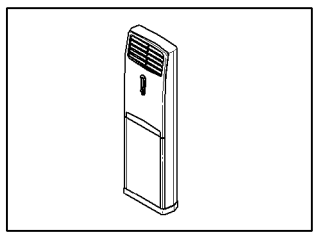 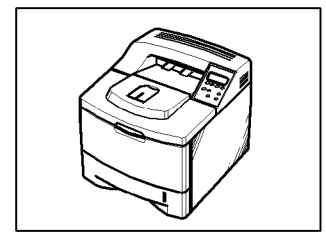
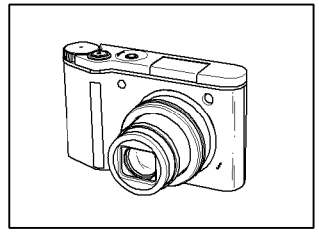 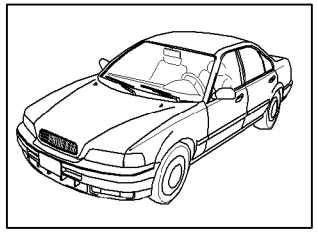 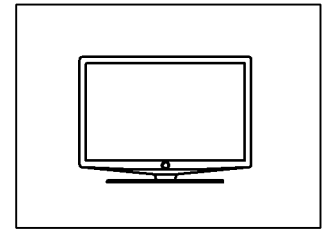

FIG. 4
| AAAA smartphone sales volume |
|---|
| Word | Frequency |
|---|---|
| AAAA | 135 |
| smartphone | 111 |
| sales volume | 97 |
| 2012 | 90 |
| PC | 54 |
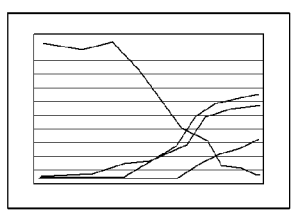 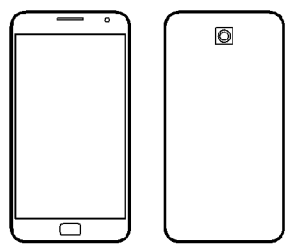 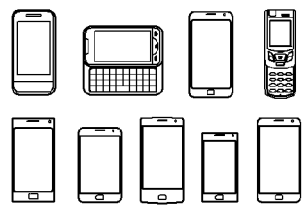
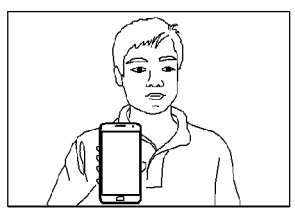 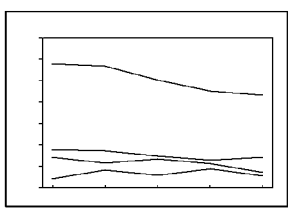 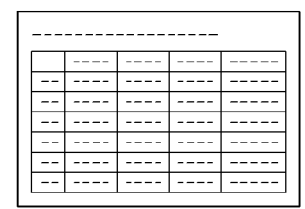

FIG. 10
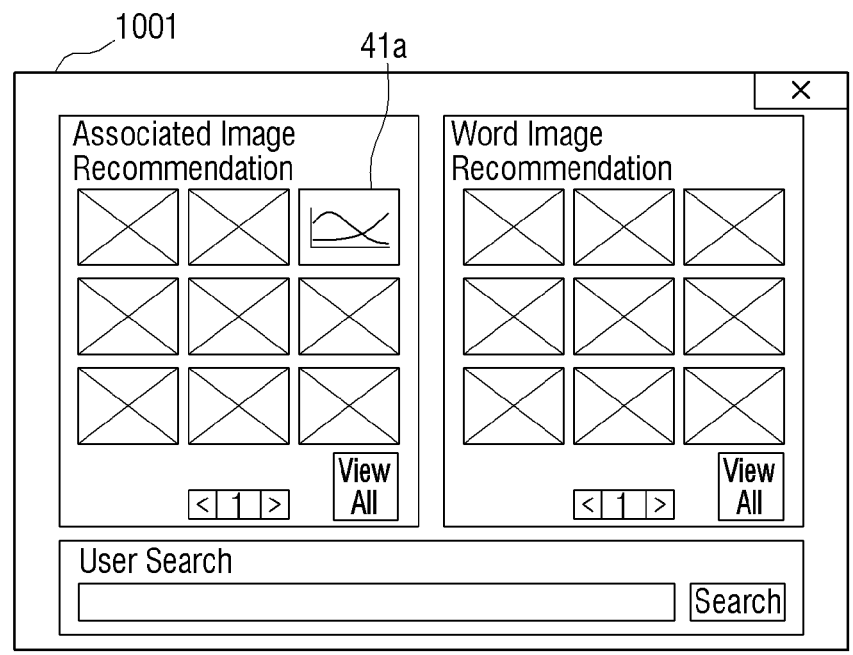
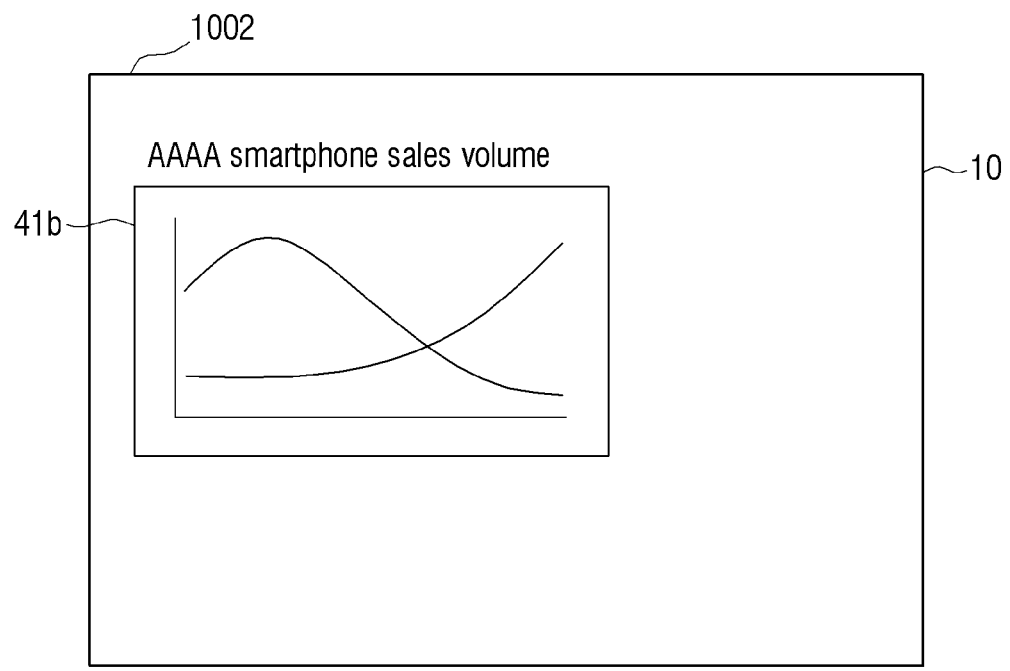

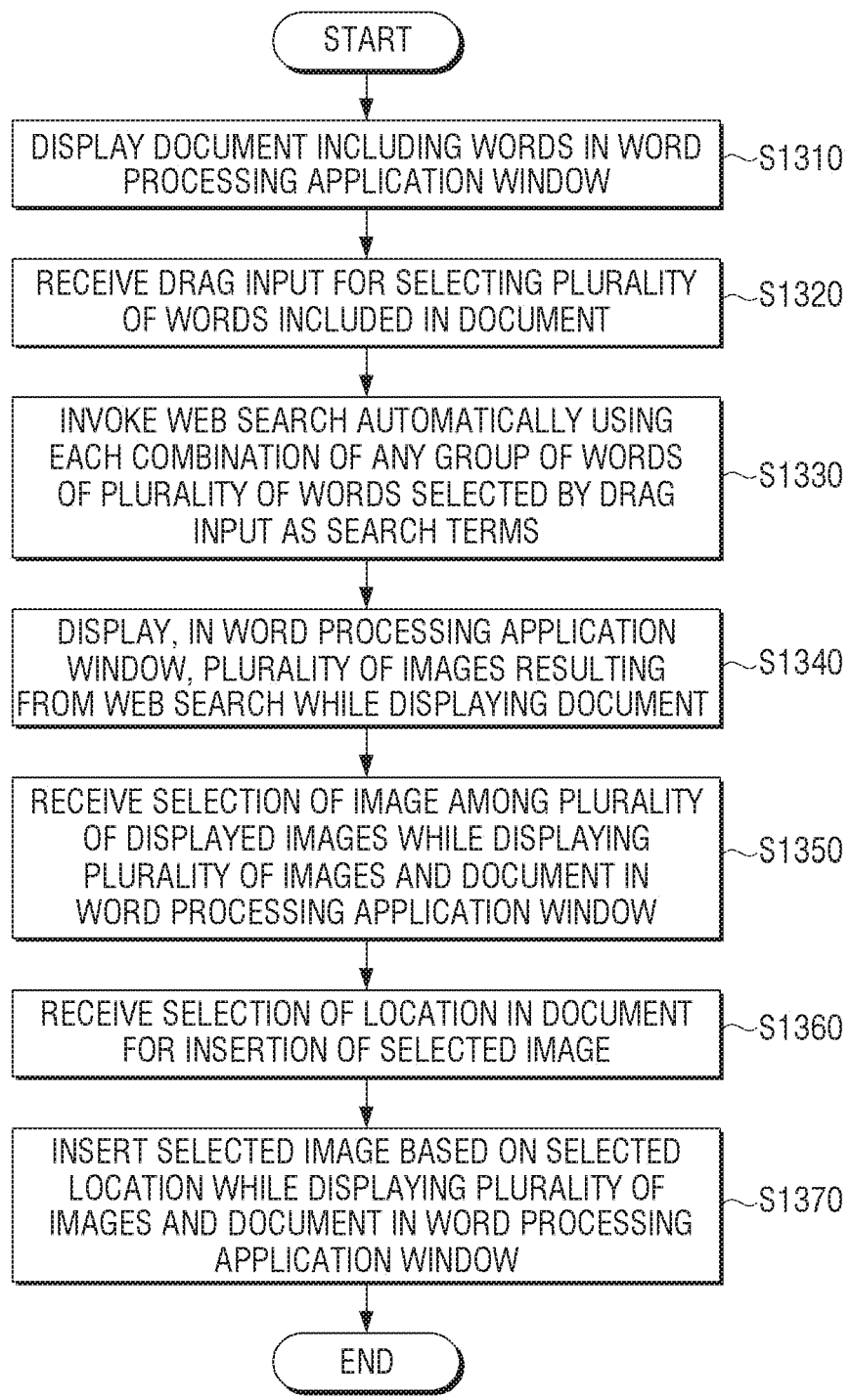

DEVICE AND METHOD FOR IMAGE SEARCH USING ONE OR MORE SELECTED WORDS

PRIORITY

This application is a continuation of prior application Ser. No. 13/937,584, filed on Jul. 9, 2013 which claims the benefit under 35 U.S.C. §119(a) of a Korean patent application filed on Oct. 17, 2012 in the Korean Intellectual Property Office and assigned Serial No. 10-2012-0115505, the entire disclosure of which is hereby incorporated by reference.

BACKGROUND OF THE INVENTION

1. Field of the Invention

The present invention relates to a user terminal device and a control method thereof. More particularly, the present invention relates to a user terminal device for searching for and inserting an image directly into a document preparation window, and a control method thereof.

2. Description of the Related Art

A user may write various documents using a document preparation program in an electronic device. A document may have content including text and may also include images accompanying text included in document contents. Hence, the document written using the document preparation program may include the text and the images. In order to insert an image using the document preparation program, the user may have to search for an image stored in a storage unit of the electronic device using an insertion menu. However, since images stored in the storage unit are limited in number, the user may also search for an image through a web browser and may select and insert the image searched for using the web browser.

The user may insert the image stored to the storage unit as described below. The user may select an insertion menu and/or execute a function for inserting an image of the document preparation program. When using the insertion menu and/or function for inserting the image, the user may find a directory including the intended image and may select the intended image in the directory, and thus, the intended image may be inserted into the current document. Alternately, the user may insert an image using the web browser as described below. The user may open a web browser window and may search for an image by inserting a search word, by searching for images on the Internet, or may locate the image on the Internet according to any suitable manner. The user may then select an image from among the image search results. The user may download and store the selected image in the storage unit of the electronic device or may copy the searched image and may then paste the image into the document preparation program window.

As discussed above, in order to insert the image during the document preparation, the user may have to perform many steps and/or processes. Accordingly, in order to insert the image stored in the storage unit, it may be difficult to know where the image is stored. In order to search for and insert the image using the web browser, it may be inconvenient to open a separate search window and/or web browser window in order to search for and select the image from the search results, and to switch back to the document preparation program window. Therefore, a need exists for a system and method for searching for an image and inserting the image more easily when the user creates a document in an electronic device, such as a user terminal device.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a user terminal device and a control method for easily searching and inserting an image in a document preparation window.

In accordance with an aspect of the present invention, a user terminal device is provided. The user terminal device includes a display part configured to display a document preparation window, an input part configured to receive a selection command for selecting a text in a document displayed in the document preparation window, a communication part configured to connect to a server, and a controller configured to control displaying of an activated search button in a region of the document preparation window when the text is selected, and to search for, when the search button is selected, at least one image corresponding to the selected text using the communication part. The controller is further configured to control displaying of images searched for from at least one of the server and a storage part of the user terminal device in the display part, and to, when one of the searched images is selected, insert the selected image at a predetermined position of the document preparation window.

When the selected text comprises a plurality of words, the controller may be further configured to control displaying of a word image searched per word and an associated image searched per combination of the words in the display part.

The controller may be further configured to insert the selected image at a selected position at a side of the selected text.

The controller may be further configured to activate the search button when there is no input during a preset time while the text is selected.

The controller may be further configured to activate the search button when at least one of a user body part and an input pen approaches the display part.

The display part may be further configured to display a search word input window, and the controller may be further configured to search for an image corresponding to a search word input through the search word input window.

In accordance with another aspect of the present invention, a user terminal device is provided. The user terminal device includes a display part configured to display a document preparation window, an input part configured to receive a text to be displayed in the document preparation window, a controller configured to control displaying, in the document preparation window, the text input through the input part, and a communication part configured to, when the text input is suspended during a preset time, search a server for an image corresponding to at least one text of the input text. The controller is further configured to control displaying of images searched for by the communication part, and to, when one of the searched images is selected, insert the selected image at a predetermined position of the document preparation window.

In accordance with another aspect of the present invention, a control method of a user terminal device is provided. The control method includes displaying a document preparation window on a display part of the user terminal device, receiving, via an input part of the user terminal device, a selection command for selecting a text in a document displayed in the document preparation window, displaying, when the text is selected, an activated search button in a region of the document preparation window, searching, when the search button is selected, for at least one image corresponding to the selected text, displaying images searched for, and inserting, when one of the searched images is selected, the selected image at a predetermined position of the document preparation window.

When the selected text comprises a plurality of words, the searching for the at least one image may include searching for a word image per word of the plurality of words and an associated image per combination of any group of the words of the plurality of words.

The inserting of the image may include inserting the selected image at a position at a side of the selected text.

The displaying of the search button may include activating the search button when there is no input during a preset time while the text is selected.

The displaying of the search button may include activating the search button when at least one of a user body part and an input pen approaches a display part.

In accordance with another aspect of the present invention, a control method of a user terminal device is provided. The control method includes displaying a document preparation window on a display part of the user terminal device, receiving a text input via an input part of the user terminal device, displaying the text in the document preparation window, searching for an image corresponding to at least one text of the input text when the text input is suspended during a preset time, displaying images searched for, and inserting a selected image at a predetermined position of the document preparation window when one of the searched images is selected to be the selected image.

Thus, the user can easily search and insert the image in a document preparation program using the user terminal device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWING

The above and other aspects, features, and advantages of certain exemplary embodiments of the present invention will be more apparent from the following description taken in conjunction with the accompanying drawings, in which:

FIG. 2 is a diagram of a word image search method according to an exemplary embodiment of the present invention;

FIGS. 3 and 4 are diagrams of an associated image search method according to an exemplary embodiment of the present invention;

FIG. 10 is a diagram of a searched image insertion according to an exemplary embodiment of the present invention; and FIGS. 11, 12, and 13 are flowcharts of a user terminal device control method according to exemplary embodiments of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
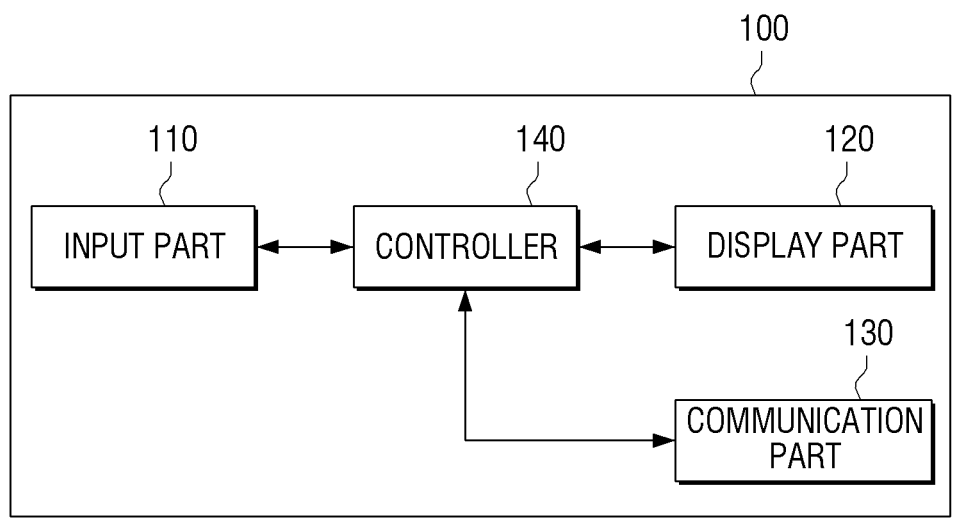
FIG. 1 is a block diagram of a user terminal device according to an exemplary embodiment of the present invention.

FIG. 1 is a block diagram of a user terminal device according to an exemplary embodiment of the present invention.

Referring to FIG. 1, a user terminal device 100 includes an input part 110, a display part 120, a communication part 130, and a controller 140. The input part 110 may receive text to be displayed in a document preparation window. According to the present exemplary embodiment, the input part 110 may receive a selection command for selecting text of a document displayed in the document preparation window. The input part 110 may be implemented according to a variety of devices included in the user terminal device 100 or may be and external device that may be connected with a variety of input means. For example, the input part 110 may include a keypad integrally formed with the user terminal device 100, a touch sensor for sensing a touch gesture, and a proximity sensor for sensing proximity of a user's body, a digital pen or any other suitable and/or similar element or means for inputting information. Alternatively, the input part 110 may be implemented using a unit or a module for receiving a user control command from an input means such as keypad, keyboard, digital pen, or any other suitable and/or similar element or means for inputting information, which is separated from the user terminal device 100.

The display part 120 may display the document preparation window. The display part 120 may search for an image corresponding to a certain text and may display the searched image. The display part 120 may be implemented using various display units such as a liquid crystal display (LCD) panel, a plasma display panel (PDP), an organic light emitting diode (OLED) display panel, a vacuum fluorescent display (VFD) panel, a field emission display (FED) panel, an electro luminescence display (ELD) panel or any other similar and/or suitable display. The display part 120 may be implemented using a general display panel having no touch input function, and may also use a display panel including a proximity sensor or a touch sensor for sensing a user manipulation. The display panel including the touch sensor may receive at least one touch gesture through a user's body parts, such as fingers including the thumb, or a detectable input means, such as a stylus pen. Such a user interface may include a touch region, a soft key, a soft menu, or any other suitable element included in a user interface.

The communication part 130 may request to search for the image corresponding to the certain text by accessing a server. The certain text may be a word, an expression, a phase combining a plurality of words, or any other similar and/or suitable combination of letters and/or text. In some cases, the text may be at least one sentence. The search will be explained in further detail below. The communication part 130 may receive the searched images from the server.

The controller 140 may display the text input through the input part 110 in the document preparation window. For example, when a word or a phrase is selected in the input text, the controller 140 may display an activated search button in a part of the document preparation window. When the search button is selected, the controller 140 may search for at least one image corresponding to the selected text using the communication part 130. For example, when the text input is suspended during a preset time, the controller 140 may search for an image corresponding to at least one text of the input text.

When receiving the searched images from the server through the communication part 130, the controller 140 may display the searched images in the display part 120. When one of the searched images is selected, the controller 140 may insert the selected image into a set position in the document preparation window. The user terminal device 100 may search for an image of the text selected in the document preparation window or for an image of a predefined text, and may display the searched images. When one of the searched images is selected, the selected image may be directly inserted into the document preparation window. The user terminal device 100 may be any electronic device having a document preparation function. For example, the user terminal device 100 may be at least a part of and/or include a personal computer (PC), a notebook, a smart phone, a tablet, a television (TV) or any other suitable and/or similar electronic device having a document preparation or editing function. A method for searching for the image corresponding to the text will be discussed below.

FIG. 2 is a diagram of a word image search method according to an exemplary embodiment of the present invention.

Referring to FIG. 2, a word AAAA may be searched for using the word image search method according to the present exemplary embodiment. For example, a web server, receiving a search request from the user terminal device 100, may search every document for a document including AAAA using AAAA as a search keyword. Images in every one of the searched documents may be may be searched and may be included in the search results. More specifically, according to the present exemplary embodiment, the images may be searched using a text-based image retrieval (TBIR) method. For example, the images may be searched using a content-based image retrieval (CBIR) method or any other similar and/or suitable TBIR method.

The CBIR method may search for an image of the word AAAA corresponding to the search request by classifying similar images into one group using a shape, a color, a pattern, or any other similar and/or suitable characteristic of the image as contents. Referring to FIG. 2, the search results according to the TBIR are depicted. With the search keyword of AAAA, images of logos, affiliates, management, advertisements, products, and rival products may be retrieved. Referring to FIG. 2, the search results include a log of AAAA, electronic products of AAAA, and the image of a vehicle and may include any other similar and/or suitable images corresponding to the search keyword of AAAA.

Figure 3:
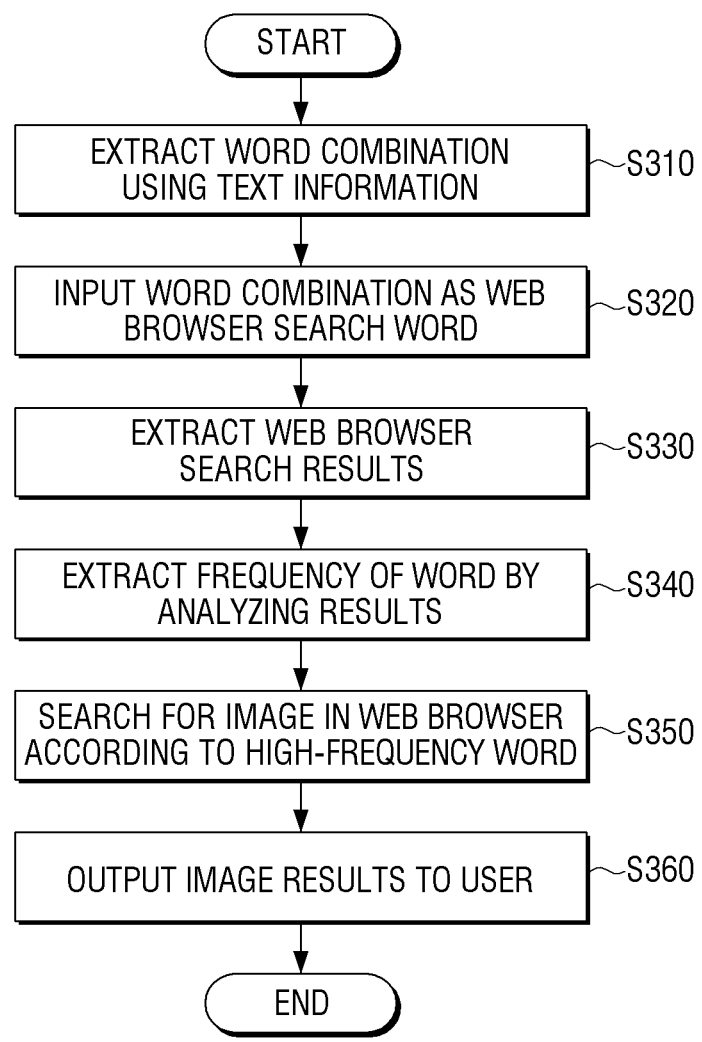

FIGS. 3 and 4 are diagrams of an associated image search method according to an exemplary embodiment of the present invention.

Referring to FIG. 3, an associated image may refer to, when the search keyword combines the words, an image retrieved using association of the words. As shown in FIG. 3, the user terminal device 100, in step S310, may extract a word combination using text information for use by the associated image search. For example, when searching for an image of AAA+BBB, which is a combination of a word AAA and a word BBB, the user terminal device 100 may extract word combinations of AAA, BBB, AAA+BBB, or any other similar and/or suitable combination and/or permutation of the words and/or letters of AAA and BBB.

The user terminal device 100 may input the word combination as a web browser search word in step S320, and may extract web browser search results in step S330. Since AAA, BBB, and AAA+BBB are the search keyword, the user terminal device 100 may retrieve documents including AAA, BBB, and AAA+BBB. The user terminal device 100 may also determine frequencies of AAA, BBB, and AAA+BBB in the searched documents. In some cases, the user terminal device 100 may search for other words associated with the stated search keyword. For example, when phrases of aa+AAA and AAA+BBB+bb may be included in the search, and the user terminal device 100 may further determine documents including aa or bb, the frequency of aa or bb, and any other similar and/or suitable search terms according to the search keyword.

The user terminal device 100 may extract the frequency of the word by analyzing the results in step S340. The user terminal device 100 may extract the frequency of each word from the whole document. In so doing, a weight may be used to extract the frequency. For example, since the AAA+BBB is the search keyword, when the weight is set to 1, a weight of 0.9 may be applied to AAA or BBB and a weight of 0.7 may be applied to aa or bb.

Next, the user terminal device 100 may search for the image in the web browser according to the word having the high frequency in step S350. The user terminal device 100 may determine a rank of the word according to the frequency and searches for the image of the high-rank word. Next, the user terminal device 100 may output image results to the user in step S360.

Referring to FIG. 4, the associated image search method is described further FIG. 4, which depicts the associated image search method according to an exemplary embodiment of the present invention. The search keyword may be a combination of a plurality of words "AAAA smartphone sales volume". As explained with respect to the exemplary embodiment of FIG. 3, the user terminal device 100 may extract the word combination using text information for the sake of the associated image search. For example, the text information corresponding to AAAA, smartphone, sales, volume, and sales volume may be used as extracted from the word combination. The user terminal device 100 may extract search results using a word or the word combination as the web browser search keyword. Furthermore, other words associated with the search keyword may be searched together with the search keyword.

The user terminal device 100 may extract the frequency of the word by analyzing the searched results. As shown in FIG. 4, the word 'AAAA' has a frequency of 135, the word 'smartphone' has the frequency of 111, the word 'sales volume' has the frequency of 97, the text of '2012' has the frequency of 90, and the text of 'PC' has the frequency of 54. Accordingly, the word 'AAAA' is the highest-frequency word and the word 'smartphone' is the next highest-frequency word. The user terminal device 100 may search the image in the web browser using a word having a high frequency and may output corresponding image results to the user. As shown in FIG. 4, images, such as sales volume graph and a smartphone, may be displayed in the display part 120 as the search results. The image may be retrieved from images stored in a local storage device, or may be retrieved by accessing the web server. The image search may use both of the retrieval of the local storage device and the web server connection. However, the present invention is not limited thereto, and the images may be retrieved from any suitable and/or similar source, resource, and/or entity.

FIGS. 5 through 8 are diagrams of the image search in the document preparation window according to various exemplary embodiments of the present invention.

Figure 5:
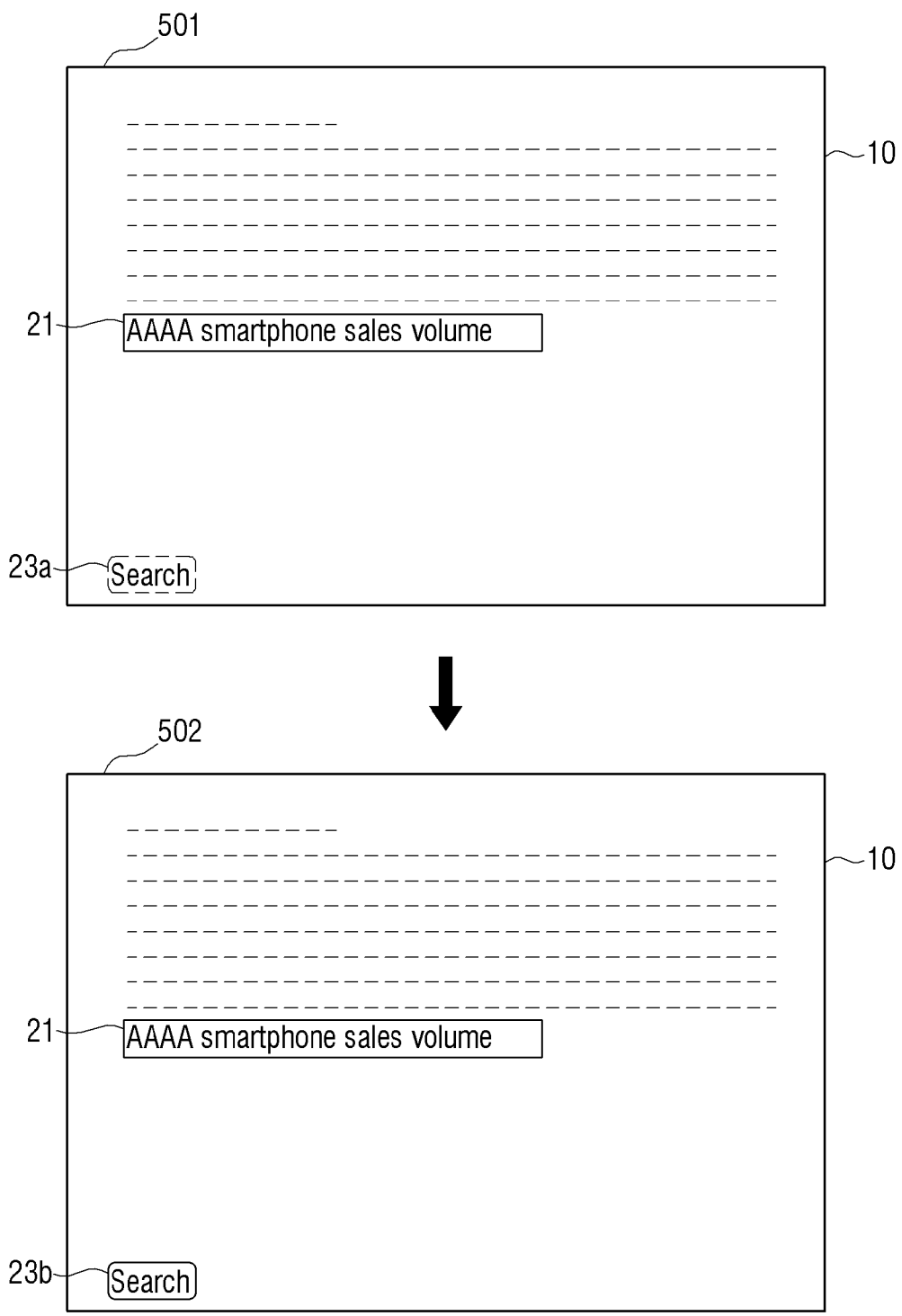
FIGS. 5 through 8 are diagrams of image search in a document preparation window according to various exemplary embodiments of the present invention.

Referring to FIG. 5, the image search may be executed by selecting the text as shown in screen 501. The display part 120 may display a document preparation window 10 in the screen 501. The document preparation window 10 may display a text created by the user. An image search button 23*a* may be inactive until the user selects the text. With respect to the present exemplary embodiment of FIG. 5, 'deactivation' may indicate that the image search button 23*a* is displayed but is not selectable, or that the image search button 23*a* is not displayed at all. The user may select "AAAA smartphone sales volume" as a keyword in a selection region 21. While the text including the plurality of the words is selected, as shown in FIG. 5, the present invention is not limited thereto, and the user may select only one word. According to the user's selection, "AAAA smartphone sales volume" is displayed in the selection region 21.

Screen 502 depicts the document preparation window 10 when the user selects the text that is displayed in the selection region 21. When the text is selected, an image search button 23*b* is displayed in an activated state so as to be selectable. While the image search button 23*a* of screen 501 is displayed but unselectable, the image search button 23*b* is selectable. Alternatively, in a case where the image search button 23*a* is not displayed in screen 501, the image search button 23*b* may be displayed in part of the document preparation window 10 in screen 502. In both screen 501 and 502, the image search buttons 23*a* and 23*b* are displayed in the lower left part of the document preparation window 10. However, the present invention is not limited thereto, and the image search buttons 23*a* and 23*b* may be displayed at any suitable part of the document preparation window 10.

Figure 6:
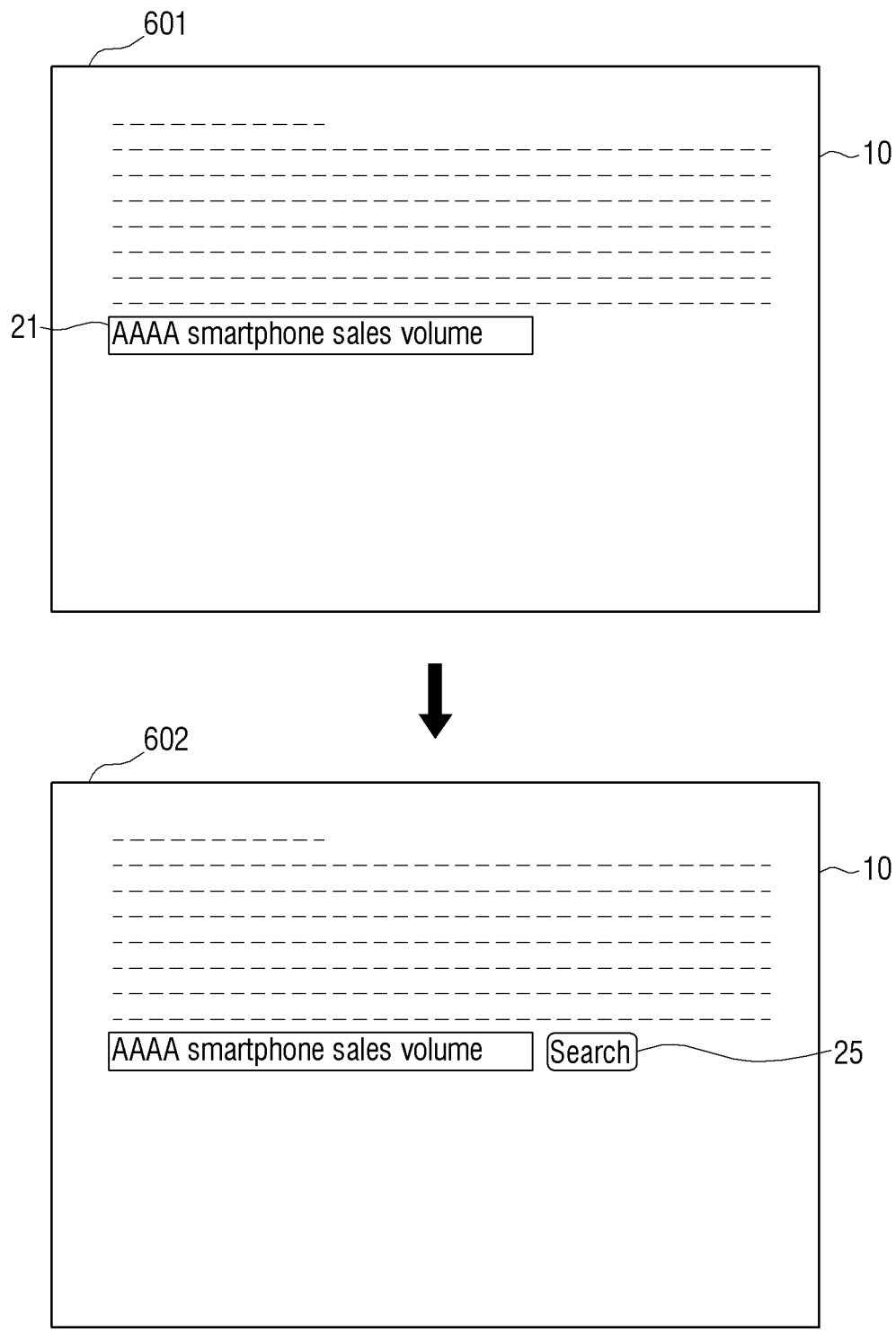

Referring to FIG. 6, a display position of an image search button 25 is shown. In screen 601, a user may select "AAAA smartphone sales volume" as the search keyword in the selection region 21. According to the user's selection, "AAAA smartphone sales volume" is displayed in the selection region 21. As shown in screen 602, according to the text selection, an image search button 25 is activated. The activated image search button 25 may be displayed on the right at the end of the selected text in the document preparation window 10. Although not shown, when the user selects the text for the image search, a pointer may be placed on the left or the right at the end of the selected text in the document preparation window 10. The pointer may indicate a user interface (UI) object for displaying a point corresponding to the input means, such as the keyboard or the mouse, in the document preparation window 10. When the image search button 25 is far away from the selected text, the user may need to move the pointer in order to execute the image search by selecting the image search button 25 using the pointer.

Accordingly, when the user selects the text for the image search and the pointer is close to the selected text, then the user may conveniently select the text and search for the image right away. Thus, the image search button 25 may be displayed in proximity of the selected text. When the user selects the text by dragging the pointer, or any other similar and or suitable means and/or element for selection, from the left to the right of the text to be selected, the image search button 25 may be displayed on the right at the end of the text in the document preparation window 10. Conversely, when the user selects the text by dragging the pointer from the right to the left, the image search button 25 may be displayed on the left at the end of the text in the document preparation window 10. In this case, when the inactive image search button 25 is displayed at all times, such displaying may make the user feel uncomfortable or experience inconvenience when viewing the document preparation window 10. Hence, according to an exemplary embodiment, it may be preferred that the user terminal device 100 does not display the image search button 25 in a normal situation, but rather, displays the image search button 25 only when the text is selected.

Figure 7:
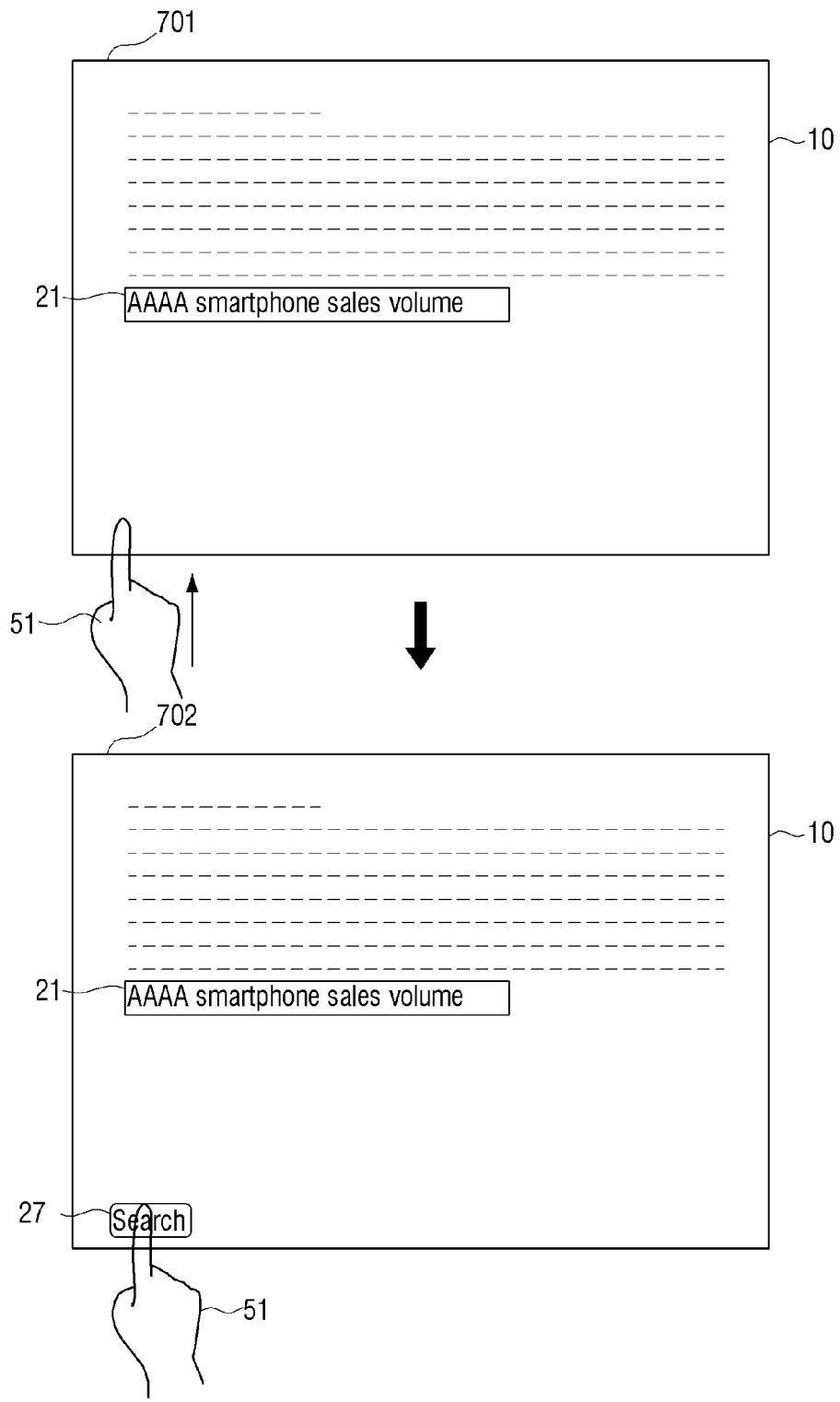

Referring to FIG. 7, screens 701 and 702 show displaying of the image search button 27 using proximity sensing. As mentioned earlier, the display part 120 may be implemented using the display panel including the proximity sensor or the touch sensor for sensing the user manipulation. As shown in screen 701, the user may select the text of "AAAA smartphone sales volume" in the selection region 21. Accordingly, the document preparation window 10 may display the selected text in the selection region 21, however the image search button 27 is not displayed. A user object 51, such as the user's hand or digital pen, may approach the display part 120 after the selection of the text, as shown in screen 701.

In screen 702, when the user object 51 approaches and/or is within a certain distance from the display part 120, the image search button 27 is displayed. The image search button 27 may be displayed in a particular region of the document preparation window 10. In this case, the user object 51 approaches the particular region for displaying the image search button 27. Alternatively, the image search button 27 may be displayed in an arbitrary region approached by the user object 51 regardless of the document preparation window 10. In such a case, a menu window (not shown) including an image search menu may be displayed. When the menu window including the image search menu is displayed, the menu window may include a menu preset by the user. For example, the menu window may include a menu including elements, operations, and functions such as delete, copy, link, and any other similar and/or suitable elements, operations and functions.

Figure 8:
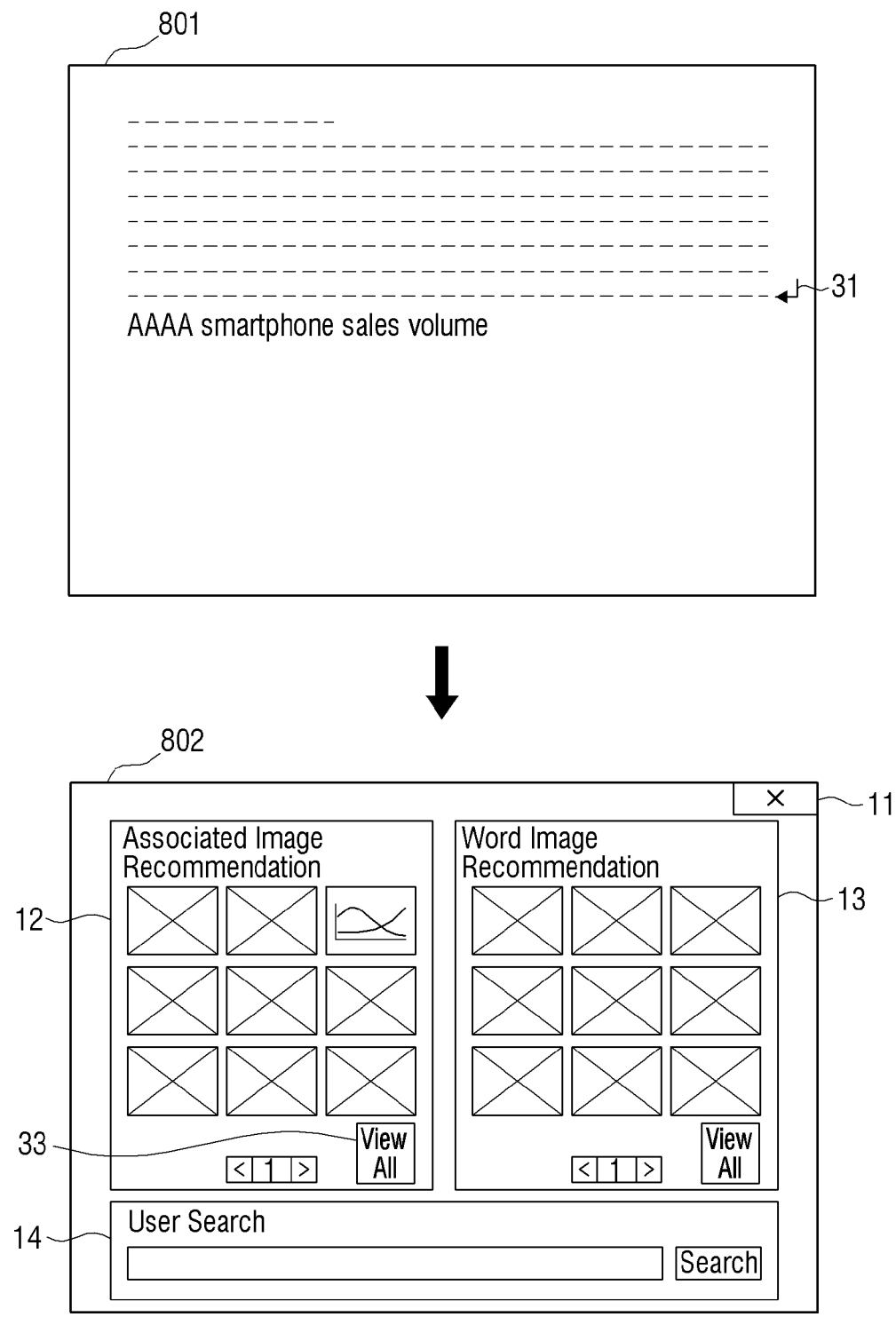

As shown in FIGS. 5, 6 and 7, the activation of the image search button has been described. When the user selects the activated image search button, the user terminal device 100 may search for the image. Alternatively, according to another exemplary embodiment, the user terminal device 100 may automatically search for the image when a preset condition is satisfied without the user's selection, and FIG. 8 depicts the automatic image search when a preset condition is satisfied.

As shown in screen 801, the user may input a text and may input a carriage return, which may be referred to as an enter 31. Next, the user may input the text "AAAA smartphone sales volume". After inputting the text "AAAA smartphone sales volume", the user may suspend the input for a preset time. After the preset time, the user terminal device 100 may automatically search for the image corresponding to the text "AAAA smartphone sales volume". For example, when the preset time is 5 seconds and 5 seconds passes after the user's suspending of the input, the user terminal device 100 may automatically search for the image. The preset time may be set to 3 seconds, 5 seconds, 7 seconds or any suitable amount of time. Alternatively, the user may arbitrarily set the time and control not to use the automatic search function.

A unit of search input, which may also be referred to as a search unit, for the automatic search may be one sentence. The one sentence may be determined according to a period or the enter 31. For example, the user terminal device 100 may recognize the text that extends from the previous enter 31 that is input or a period that is input up to the next enter 31 that is input or period that is input, as one sentence that is the search unit. Alternatively, the user terminal device 100 may search for a plurality of words in one sentence unit to be the search unit. The search unit and the preset time may be set by the user. When detecting no input during the preset time, the user terminal device 100 may automatically search for the image based on the set search unit.

Screen 802 shows the search results, wherein the user terminal device 100 displays the associated images searched for by combining the plurality of the words, and displays the word images of the words as the search results. The associated images that are the search results may be displayed in an associated image recommendation window 12, and searched word images, which are also the search results, may be displayed in a word image recommendation window 13. The search results may also be displayed in a new window which is popped up, or may be displayed in part of the document preparation window 10, or may be displayed according to any suitable and/or similar means. The user may close the search result window by selecting a cancel button 11. The associated image recommendation window 12 and the word image recommendation window 13 may display a view all button 33. When the user selects the view all button 33, a new window displaying only the corresponding search images may be opened. The search result window may include a user search window 14. The user search window 14 may allow the user to input and search the text in person. By inputting the text to search in the user search window 14 and selecting the search button, the user may search for new images corresponding to the input text.

Figure 9:
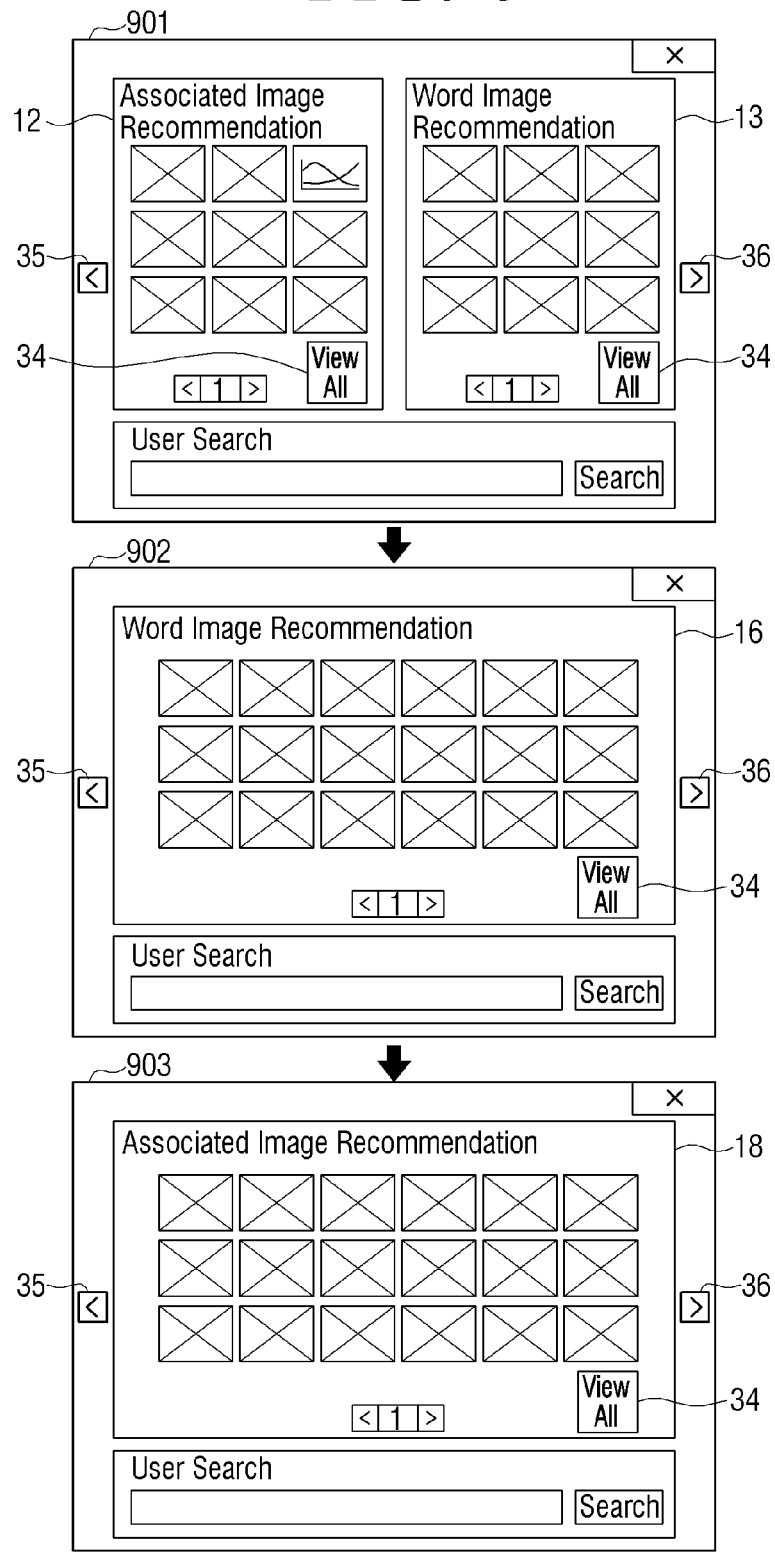
FIG. 9 is a diagram of a screen showing image search results according to an exemplary embodiment of the present invention.

FIG. 9 is a diagram of a screen showing image search results according to an exemplary embodiment of the present invention.

Referring to FIG. 9, a screen 901 displays the search results, wherein the search result display window of screen 901 is the same as the window of FIG. 8 and its detailed descriptions shall be omitted. The search result display window may include screen switch buttons 35 and 36. When the user selects any of the screen switch buttons 35 and 36, the associated image recommendation window 12, the word image recommendation window 13, and the screen 901 displaying both of the associated image recommendation window 12 and the word image recommendation window 13 may be switched according to a preset order. When the user selects the screen switch button 36, which is disposed on the right side of the screen 901, then the screen 901 is switched to the word image recommendation window, which is shown in screen 902.

As shown in the screen 902, the user terminal device 100 may display a word image recommendation window 16. Hence, the user terminal device 100 may display more images retrieved for the selected word. When the user selects a view all button 34, the user terminal device 100 may switch to a screen displaying only the images retrieved for the word. When the user selects the screen switch button 35, which is disposed on the left side of the screen 902, the user terminal device 100 may switch back to the screen 901 displaying both of the associated image recommendation window 13 and the word image recommendation window 13. When the user selects the screen switch button 35 again, the screen 902 may be switched to the associated image recommendation window 18, as shown in screen 903.

The user terminal device 100 may displays the associated image recommendation window 18 in the screen 903. Hence, the user terminal device 100 may display more associated images retrieved for the selected word. A basic structure or operation of the screen 903 may be the same as in the screen 902 and a detailed description thereof shall be omitted herein. Furthermore, the user may select one of the searched images from any of the screens 901, 902, and 903 and may insert the selected image into the document preparation window 10.

FIG. 10 is a diagram of a searched image insertion according to an exemplary embodiment of the present invention.

As shown in screen 1001, the user terminal device 100 may display a window displaying both of the associated image recommendation window and the word image recommendation window. The user may select one image 41a including a graph in the associated image recommendation window of the screen 1001. While the one image 41a is selected in screen 1001, the present invention is not limited thereto, and the user may select a plurality of images in the word image recommendation window of screen 1001.

As shown in screen 1002, a selected image 41b may be inserted into the document preparation window 10. The selected image 41b may be inserted at a position of the cursor, wherein the cursor is placed at the position before the image search is executed. Alternatively, the selected image 41b may be inserted into a next line of the text selected for the search. The user may edit the selected image 41b inserted in the document preparation window 10, and may perform a size adjustment, a color adjustment, a text input, and any other similar and/or suitable editing operation and/or function.

Figure 11:
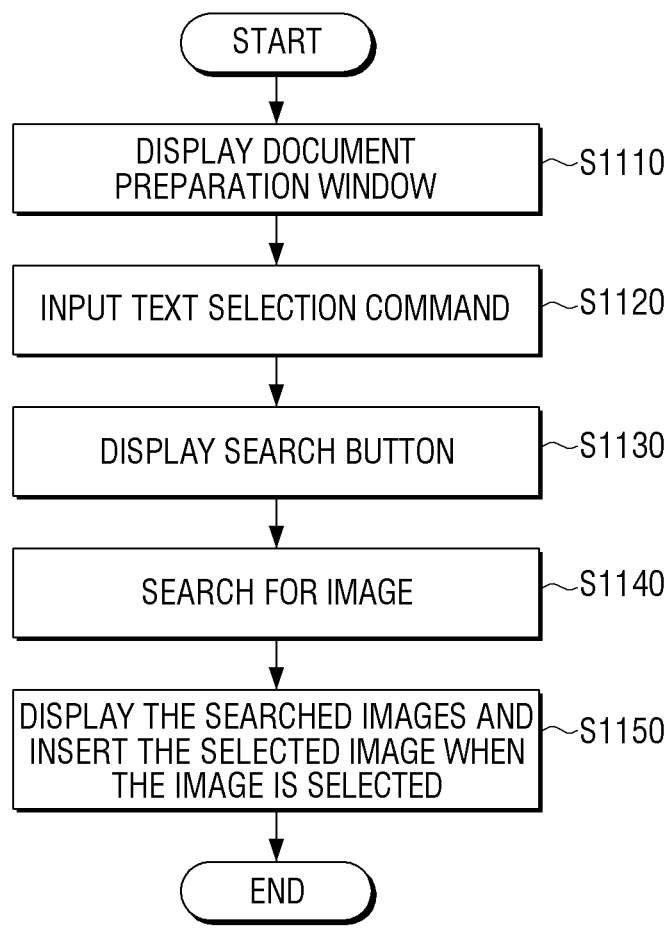
Figure 12:
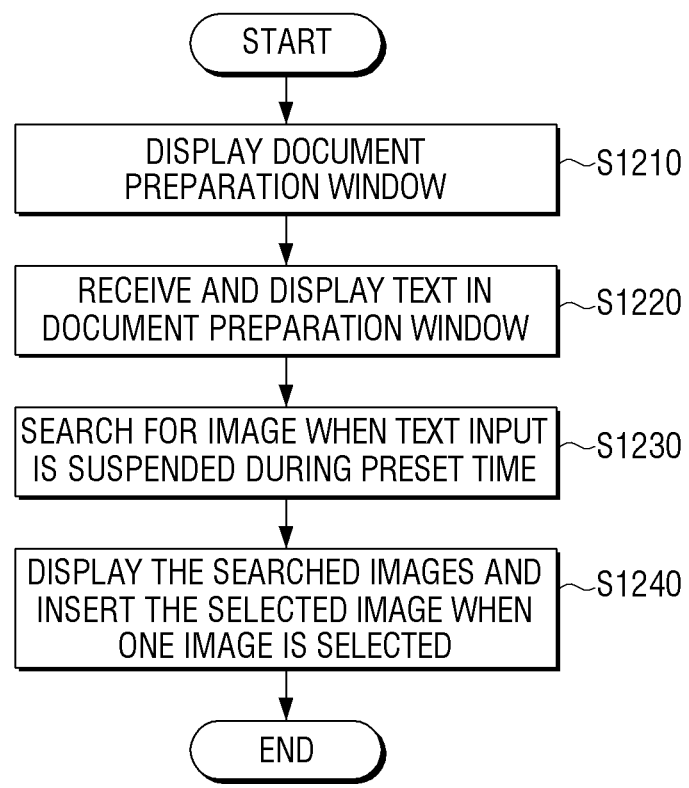

FIGS. 11, 12, and 13 are flowcharts of a user terminal device control method according to exemplary embodiments of the present invention.

Referring to FIG. 11, a flowchart of the control method of the user terminal device 100 for the user to search for the image by selecting the text is shown. The user terminal device 100 may display the document preparation window in step S1110. The document preparation window may display a generated document, or the user may input a text in the document preparation window. The user terminal device may receive an inputted text selection command in step S1120. The user terminal device 100 may receive the text selection command through an external input means such as keyboard. Furthermore, the user terminal device 100 including the touch sensor may receive the text selection command according to a touch gesture or a drag gesture or may receive the text selection command according to any similar and/or suitable means. After the text selection command is received in step S1120, then the user terminal device 100 may display the image search button at a preset position in step S1130.

When the user selects the image search button which is displayed in step S1130, the user terminal device 100 searches for the image in step S1140. The image search may be conducted by requesting the search from the web server through the communication part 130 of the user terminal device 100. The user terminal device 100 may also retrieve the image stored in its internal storage or a storage device connected to the user terminal device. The user terminal device 100 may display the searched images and may insert the selected image when the image is selected in step S1150, which has been described in detail above and shall be omitted herein.

Referring to FIG. 12, a flowchart of the control method of the user terminal device 100 for searching for the image according to a preset condition is shown. The user terminal device 100 may display the document preparation window in step S1210. The user terminal device 100 may then receive and display the text in the document preparation window in step S1220, which is the same as explained with reference to FIG. 11 and shall be omitted herein. When the text input is suspended during a preset time, the user terminal device 100 may automatically search for the image in step S1230. As discussed above, the preset time can be altered to be any suitable time. When the searched images are displayed and one of the images is selected, the user terminal device 100 may insert the selected image in step S1240. However, the present invention is not limited thereto, and one or more images may be selected and displayed.

Referring to FIG. 13, a flowchart of the control method of the user terminal device 100 for editing a document using a word processing application is shown. The user terminal device 100 may display, by the word processing application, a document including words in a word processing application window in step S1310. The user terminal device 100 may receive a drag input for selecting a plurality of words included in the document displayed in the word processing application window in step S1320. The user terminal device 100 may invoke, by the word processing application, a web search automatically using each combination of any group of words of the plurality of words selected by the drag input as search terms in step S1330. The user terminal device 100 may display, in the word processing application window, a plurality of images resulting from the web search while displaying the document in step S1340. The user terminal device 100 may receive a selection of an image among the plurality of displayed images while displaying the plurality of images and the document in the word processing application window in step S1350. The user terminal device 100 may receive a selection of a location in the document for insertion of the selected image in step S1360. The user terminal device 100 may insert the selected image based on the selected location while displaying the plurality of images and the document in the word processing application window in step S1370. However, the present invention is not limited thereto.

The control method of the display device according to various exemplary embodiments of the present general inventive concept may be realized by a program and may be provided and displayed in the display device. For example, a non-transitory computer readable medium may store a program for receiving the selection command for selecting the text in the displayed document in the document preparation window, may execute a displaying of the activated search button in part of the document preparation window when the text is selected, may execute a searching for at least one image corresponding to the selected text when the search button is selected, may execute a displaying of the searched images, and may execute a inserting of the selected image, when one of the searched images is selected, to the fixed position in the document preparation window.

The non-transitory computer readable medium may be a device-readable medium for storing data, such as a random access memory (RAM), a read-only memory (ROM), a compact disc (CD), a digital versatile disc (DVD), a hard disc, a blueray disc, a universal serial bus (USB) device, a memory card, or any other similar and/or suitable non-transitory computer readable medium.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for editing a document using a document editing application on an electronic device, the method comprising:
    displaying the document in a display area of the document editing application; and
    while displaying the document in the display area of the document editing application, using the document editing application to at least:
        receive, in the display area of the document editing application, a drag input for selecting a plurality of words from the document,
        based on receiving an input for a user interface item provided by the document editing application, invoke a web search using both the selected plurality of words and at least one word associated with the selected plurality of words, wherein the at least one word is identified in the electronic device, the identified at least one word is other than the selected plurality of words, and the selected plurality of words and the identified at least one word for the web search are transmitted toward a web search server,
        display a plurality of images together in another display area of the document editing application, wherein the plurality of the images are obtained based on the web search invoked from the document editing application using both the selected plurality of words and the identified at least one word, and the web search is performed by the web search server, and
        based on receiving an input for inserting an image selected from the obtained plurality of images, insert the selected image at a location in the document while displaying the obtained plurality of images in the other display area of the document editing application.

2. The method of claim 1, wherein the selected plurality of words and the identified at least one word are sent toward the web search server for the invoked web search.

3. The method of claim 1, wherein the inserting the selected image at the location in the document comprises inserting the selected image at a location of a cursor placed in the document.

4. An electronic device comprising:
a memory storing a document editing application; and
a processor configured to control to display a document in a display area of the document editing application, and control to, while displaying the document in the display area of the document editing application, use the document editing application to at least:
control to receive, in the display area of the document editing application, a drag input for selecting a plurality of words from the document,
control to, based on receiving an input for a user interface item provided by the document editing application, invoke a web search using both the selected plurality of words and at least one word associated with the selected plurality of words, wherein the at least one word is identified in the electronic device, the identified at least one word is other than the selected plurality of words, and the selected plurality of words and the identified at least one word for the web search are transmitted toward a web search server,
control to display a plurality of images together in another display area of the document editing application, wherein the plurality of the images are obtained based on the web search invoked from the document editing application using both the selected plurality of words and the identified at least one word, and the web search is performed by the web search server, and
control to, based on receiving an input for inserting an image selected from the obtained plurality of images, insert the selected image at a location in the document while displaying the obtained plurality of images in the other display area of the document editing application.

5. The electronic device of claim 4, wherein the selected plurality of words and the identified at least one word are sent toward the web search server for the invoked web search.

6. The electronic device of claim 4, wherein the processor is configured to control to insert the selected image at the location in the document by controlling to insert the selected image at a location of a cursor placed in the document.

7. A non-transitory computer readable recording medium storing a document editing application executable by a processor of an electronic device to cause the processor to at least:
control to display the document in a display area of the document editing application; and
control to, while displaying the document in the display area of the document editing application, use the document editing application to at least:
control to receive, in the display area of the document editing application, a drag input for selecting a plurality of words from the document,
control to, based on receiving an input for a user interface item provided by the document editing application, invoke a web search using both the selected plurality of words and at least one word associated with the selected plurality of words, wherein the at least one word is identified in the electronic device, the identified at least one word is other than the selected plurality of words, and the selected plurality of words and the identified at least one word for the web search are transmitted toward a web search server,
control to display a plurality of images together in another display area the document editing application, wherein the plurality of the images are obtained based on the web search invoked from the document editing application using both the selected plurality of words and the identified at least one word, and the web search is performed by the web search server, and
control to, based on receiving an input for inserting an image selected from the obtained plurality of images, insert the selected image at a location in the document while displaying the obtained plurality of images in the other display area of the document editing application.

8. The non-transitory computer readable recording medium of claim 7, wherein the selected plurality of words and the identified at least one word are sent toward the web search server for the invoked web search.

9. The non-transitory computer readable recording medium of claim 7, wherein the document editing application causes the processor to control to insert the selected image at the location in the document by controlling to insert the selected image at a location of a cursor placed in the document.

10. A method for editing a document using a document editing application on an electronic device, the method comprising:
controlling to display the document in a display area of the document editing application; and
controlling to, while displaying the document in the display area of the document editing application, use the document editing application for at least:
controlling to receive, in the display area of the document editing application, a drag input for selecting a plurality of words from the document,
controlling to identify, based on receiving an input for a user interface item provided by the document editing application, invoke a web search using both the selected plurality of words and at least one word associated with the selected plurality of words, wherein the at least one word is identified in the electronic device, the identified at least one word is other than the selected plurality of words, and the selected plurality of words and the identified at least one word for the web search are transmitted toward a web search server,
controlling to display a plurality of images together in another display area of the document editing application, wherein the plurality of the images are obtained based on the web search invoked from the document editing application using both the selected plurality of words and the identified at least one word, and the web search is performed by the web search server, and
controlling to, based on receiving an input for inserting an image selected from the obtained plurality of images, insert the selected image at a location in the document while displaying the obtained plurality of images in the other display area of the document editing application.

11. The method of claim 10, wherein the selected plurality of words and the identified at least one word are sent toward the web search server for the invoked web search.

12. The method of claim 10, wherein the controlling to insert the selected image at the location in the document comprises controlling to insert the selected image at a location of a cursor placed in the document.

* * * * *